United States Patent [19]
Maichel

[11] Patent Number: 5,732,728
[45] Date of Patent: Mar. 31, 1998

[54] VALVE INSERTION METHOD AND ASSEMBLY FOR INSERTING A VALVE IN A LINE

[76] Inventor: Jeffrey L. Maichel, 36493 Summitville St., Temecula, Calif. 92592

[21] Appl. No.: 819,401

[22] Filed: Mar. 17, 1997

Related U.S. Application Data

[63] Continuation-in-part of Ser. No. 603,884, Feb. 22, 1996, Pat. No. 5,611,365.

[51] Int. Cl.$^6$ .................. F16K 3/02; F16K 3/30; F16K 43/00

[52] U.S. Cl. .................. 137/15; 30/96; 30/98; 82/113; 137/238; 137/318; 251/327; 251/328; 251/329

[58] Field of Search .................. 30/92, 94, 95, 30/96, 98; 82/78, 113; 83/745; 137/15, 238, 240, 315, 318; 251/326, 327, 328, 329

[56] References Cited

U.S. PATENT DOCUMENTS

| | | | |
|---|---|---|---|
| 587,108 | 7/1897 | Sherrerd | 30/98 |
| 1,989,768 | 2/1935 | Nieman | 137/318 |
| 2,763,282 | 9/1956 | Reedy et al. | 137/318 |
| 2,899,983 | 8/1959 | Farris | 137/318 |
| 2,964,290 | 12/1960 | Mueller | 137/318 |
| 2,983,477 | 5/1961 | Merrill | 137/318 |
| 3,091,260 | 5/1963 | Milanovits et al. | 138/94 |
| 3,227,011 | 1/1966 | Larry | 137/318 |
| 3,603,387 | 9/1971 | Schoeffler | 137/318 |
| 3,650,547 | 3/1972 | Tickett | 137/318 |
| 3,687,166 | 8/1972 | Herrin | 137/318 |
| 3,703,906 | 11/1972 | Tickett | 137/318 |
| 3,735,775 | 5/1973 | Tickett | 137/318 |
| 3,773,067 | 11/1973 | Ray | 137/318 |
| 3,799,182 | 3/1974 | Long | 137/15 |
| 3,891,146 | 6/1975 | Blazek | 138/943 |
| 3,948,282 | 4/1976 | Yano | 137/15 |

(List continued on next page.)

OTHER PUBLICATIONS

Service Brochure of Free Flow Tapping & Inserting Company, Inc. for field services for valve inserting and pressure tapping, published 1991.

Product Catalog of International Flow Technologies, Inc. for a gate valve referred to as a Dylan Swedge Valve, published 1995.

Product Catalog of ITT Fluid Technology Corporation for cast knife gate and special fabricated valves, published 1993.

Product Catalog of Mueller Company, pp. 21–1 and 21–2 on cut-in sleeves and valves, pp. 22–1 through 22–7 on inserting valves and equipment, and p. 25–13 on engineering information, publshed 1993.

*Primary Examiner*—George L. Walton
*Attorney, Agent, or Firm*—Loyal McKinley Hanson

[57] ABSTRACT

A method for inserting a valve in a line includes providing a valve body that assembles on and rotates about an existing pipe. A first sealing mechanism is provided on the valve body that enables a user to selectively open (unseal) and close (seal) a gate access opening through the valve body. At least one cutting assembly is provided on the valve body for cutting the pipe as the valve body is rotated about the pipe, as well as a removably mountable gate assembly. The method proceeds by assembling the valve body on the pipe, rotating the valve body about the pipe with the cutting assembly and without the gate assembly, operating the cutting assembly to form the cut in the pipe (and removing any debris), mounting the gate assembly on the valve body, and then opening the gate access opening to enable movement of the gate through the gate access opening to a closed gate position within the cut in the pipe. One valve insertion assembly includes a removably mounted cutting assembly that moves a cutting element through the gate access opening to form the cut before withdrawing the cutting element, closing the gate access opening (and removing a residue receptacle), and replacing the cutting assembly with the gate assembly. A second access opening and second sealing mechanism may be included for cutting assembly access and/or pipe residue removal purposes also.

18 Claims, 9 Drawing Sheets

U.S. PATENT DOCUMENTS

| | | | |
|---|---|---|---|
| 3,984,282 | 10/1976 | Kleimola | 176/38 |
| 4,141,378 | 2/1979 | Wegner et al. | 137/315 |
| 4,177,827 | 12/1979 | Smith et al. | 137/318 |
| 4,370,995 | 2/1983 | Smith | 137/318 |
| 4,516,598 | 5/1985 | Stupak | 137/318 |
| 5,074,526 | 12/1991 | Ragsdale | 137/15 |

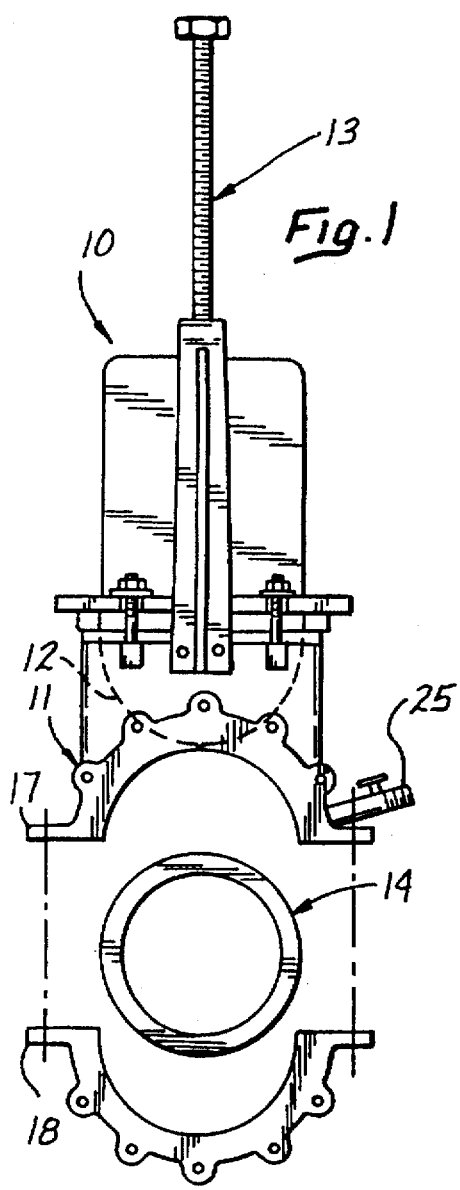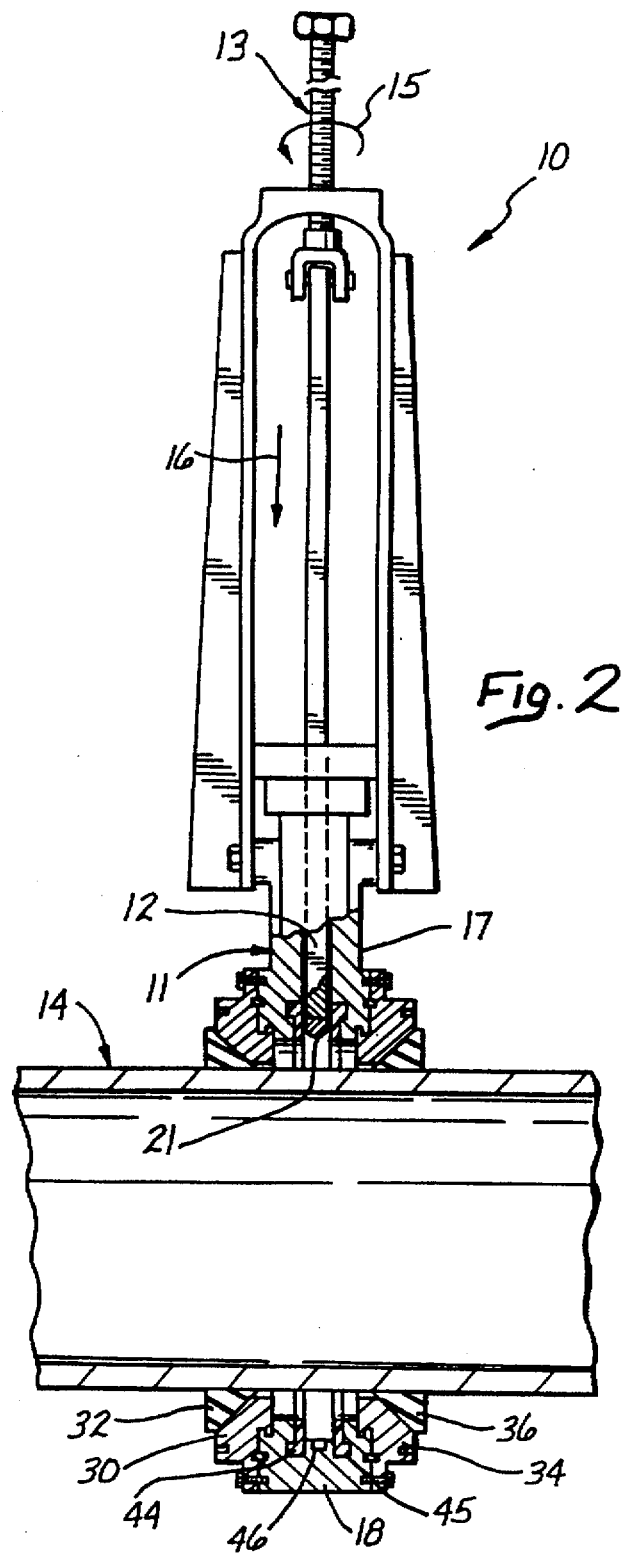

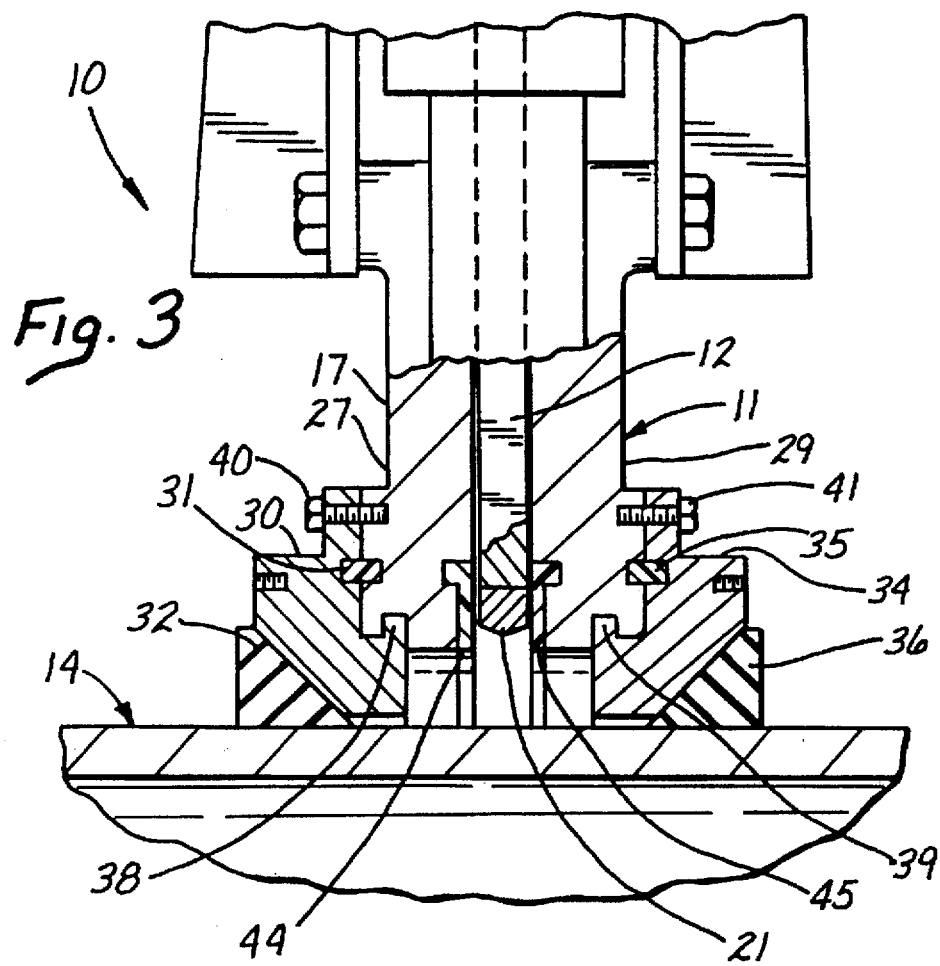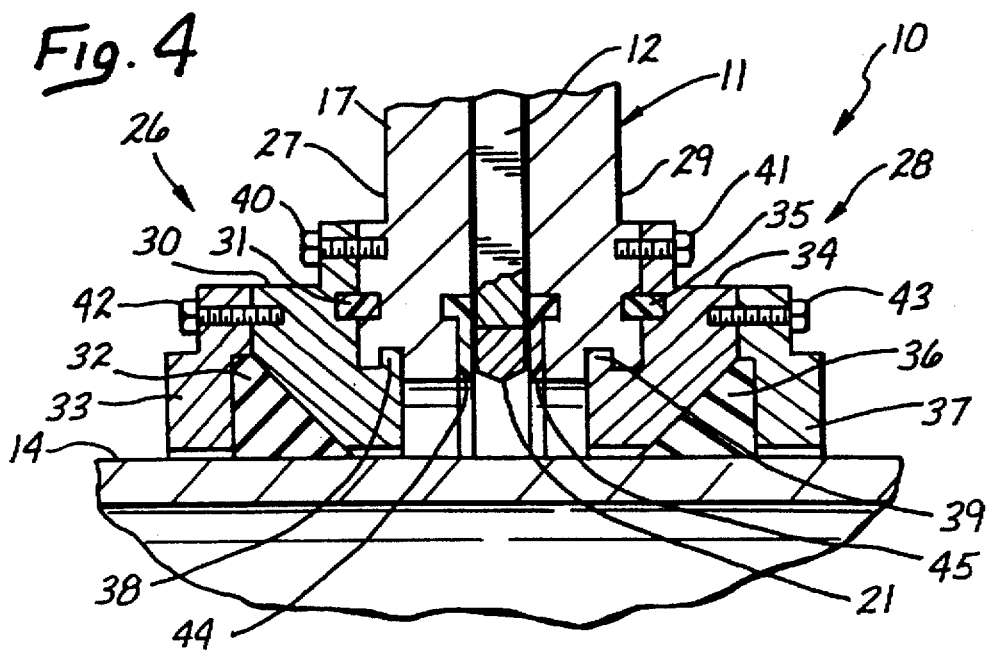

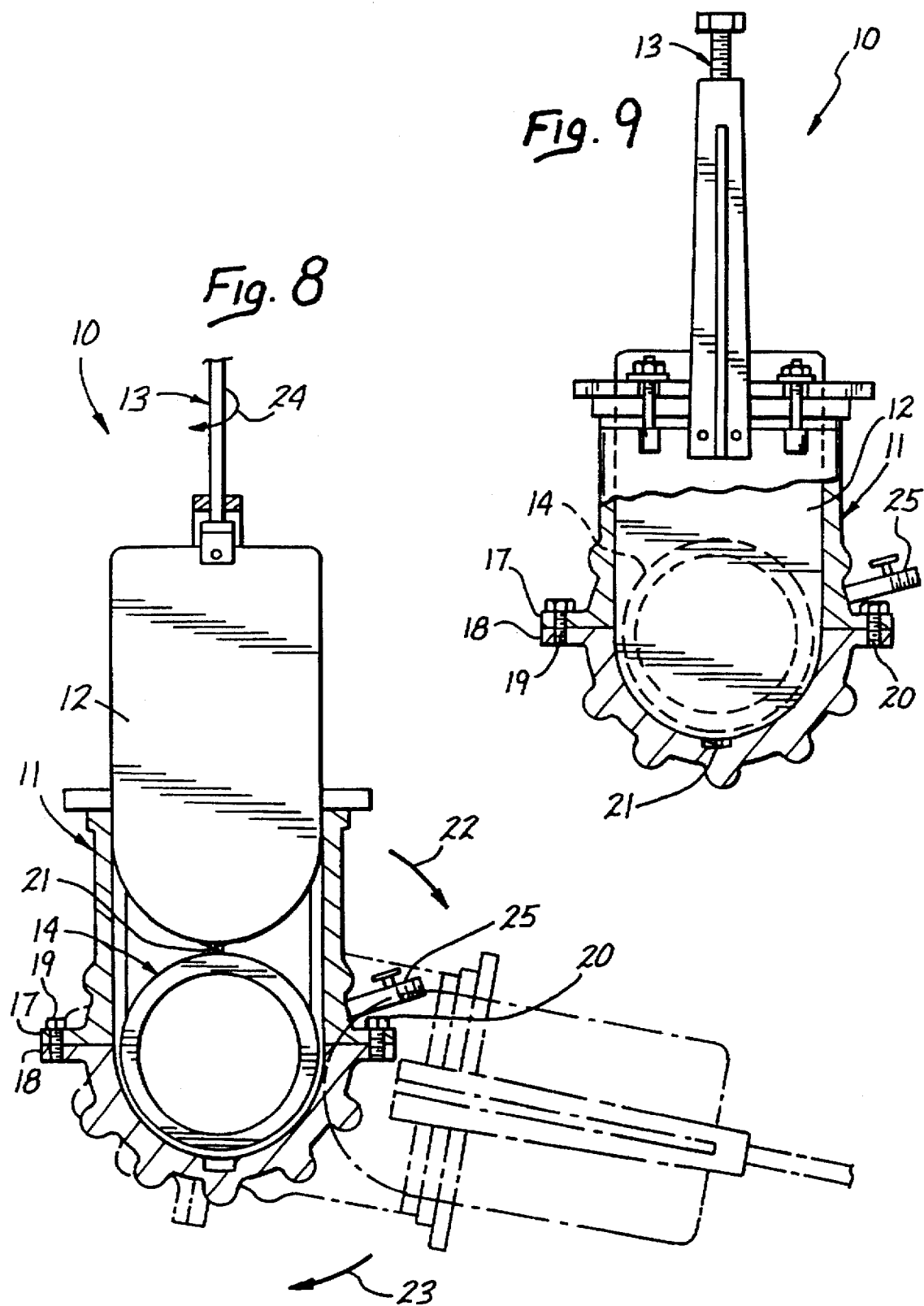

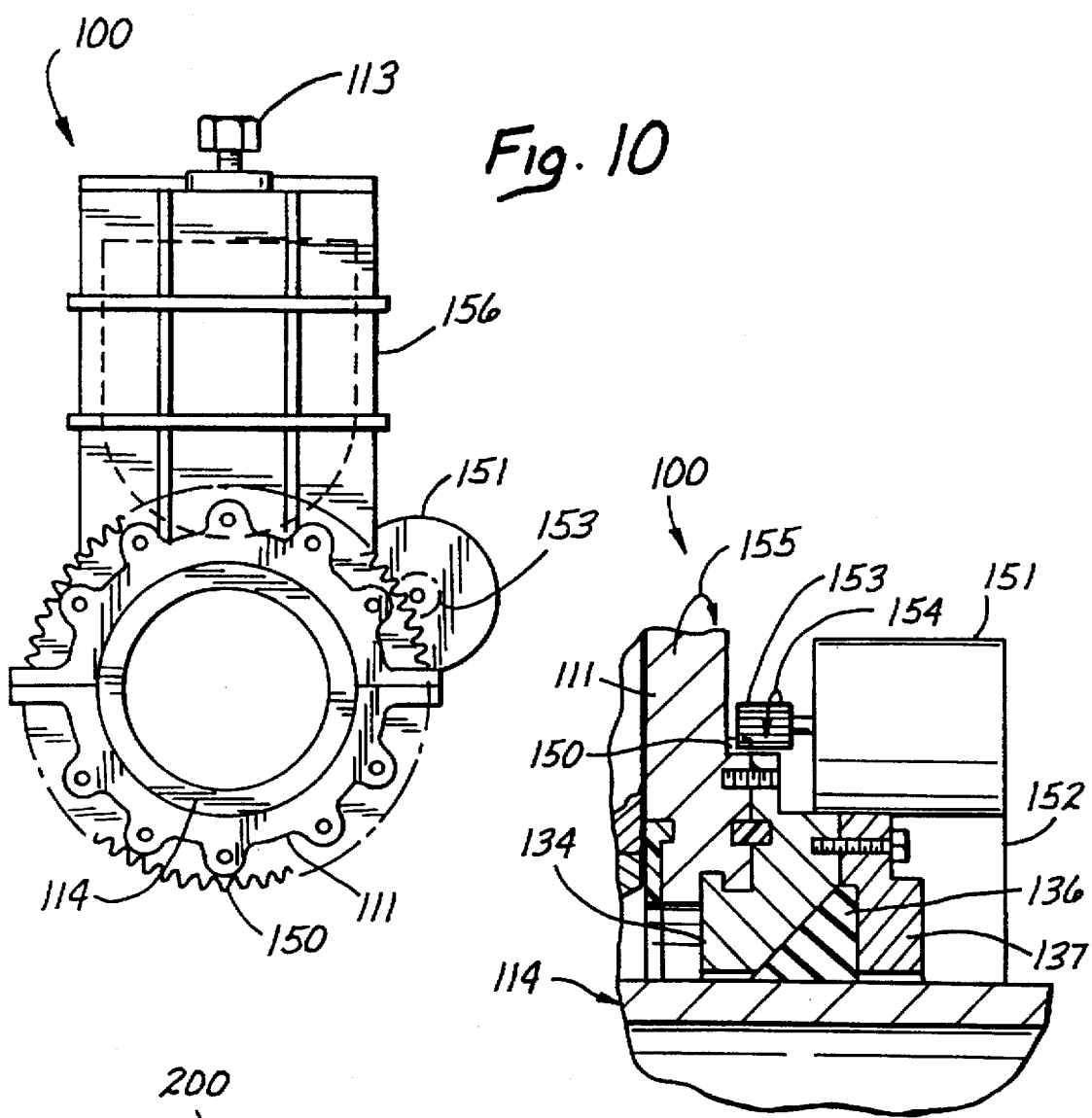
Fig. 10
Fig. 11
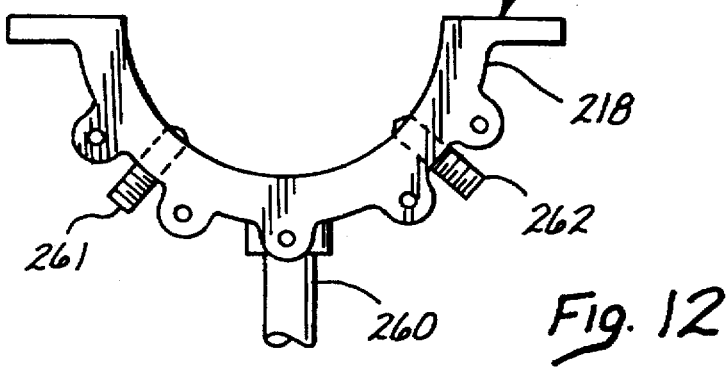
Fig. 12

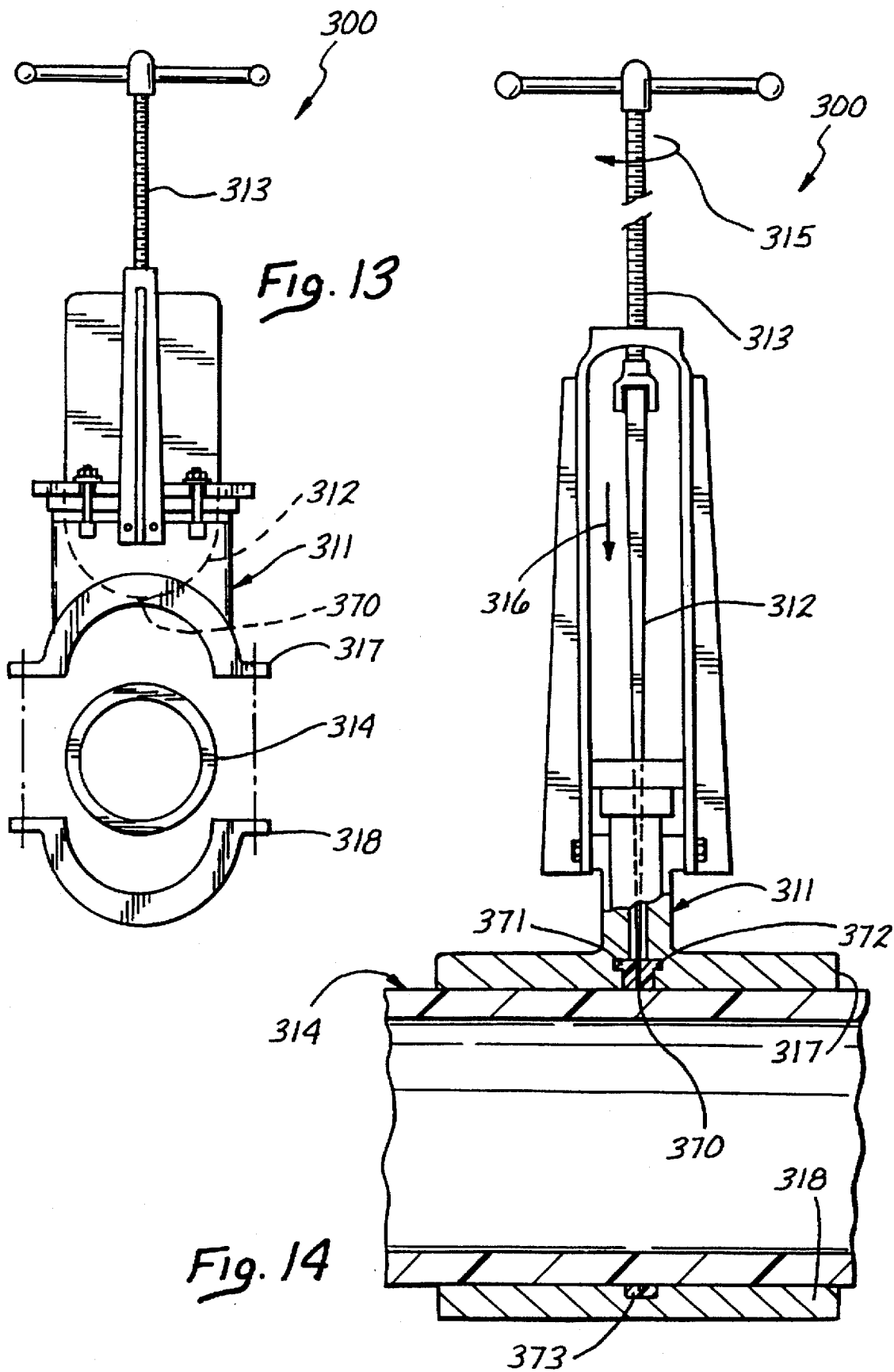

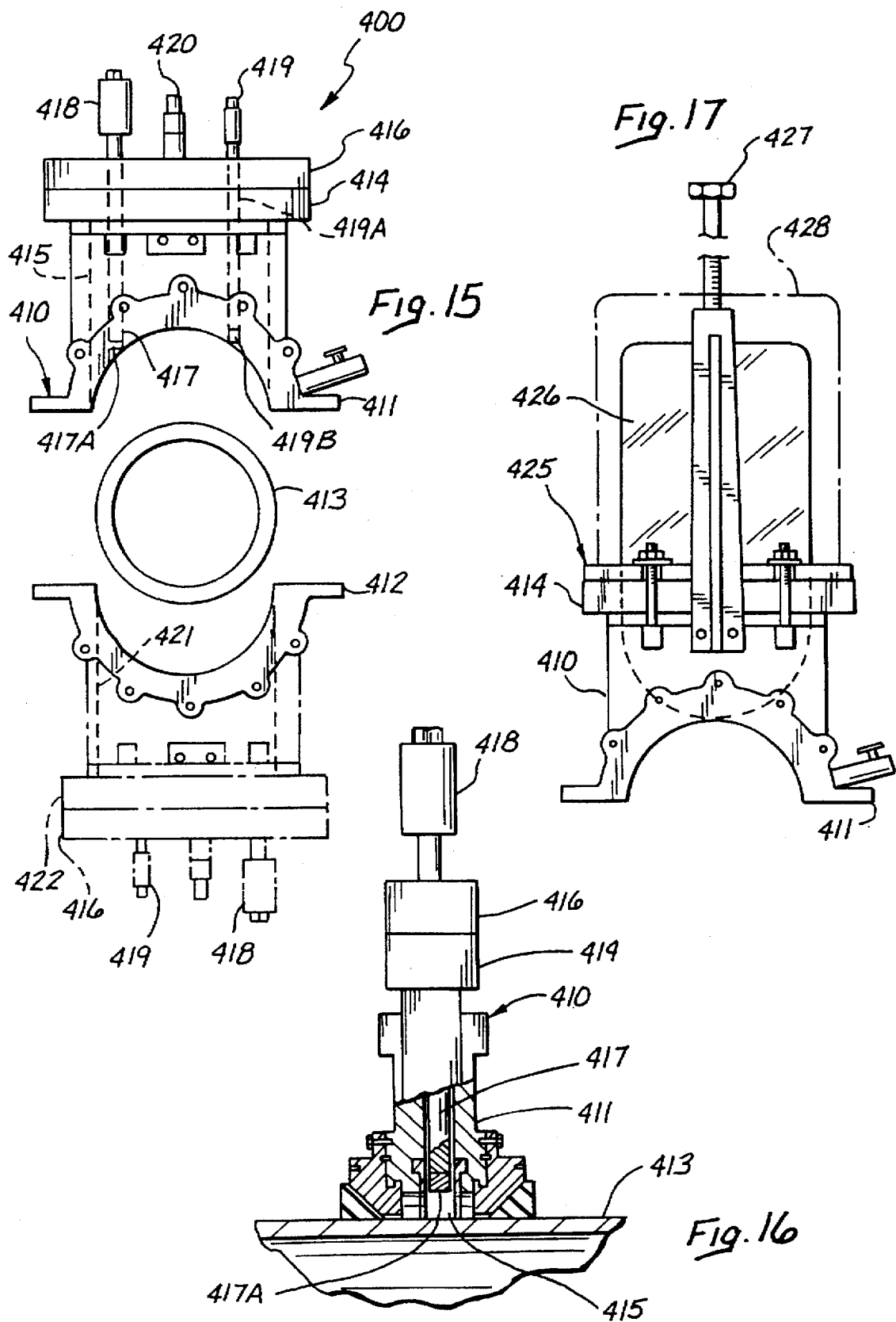

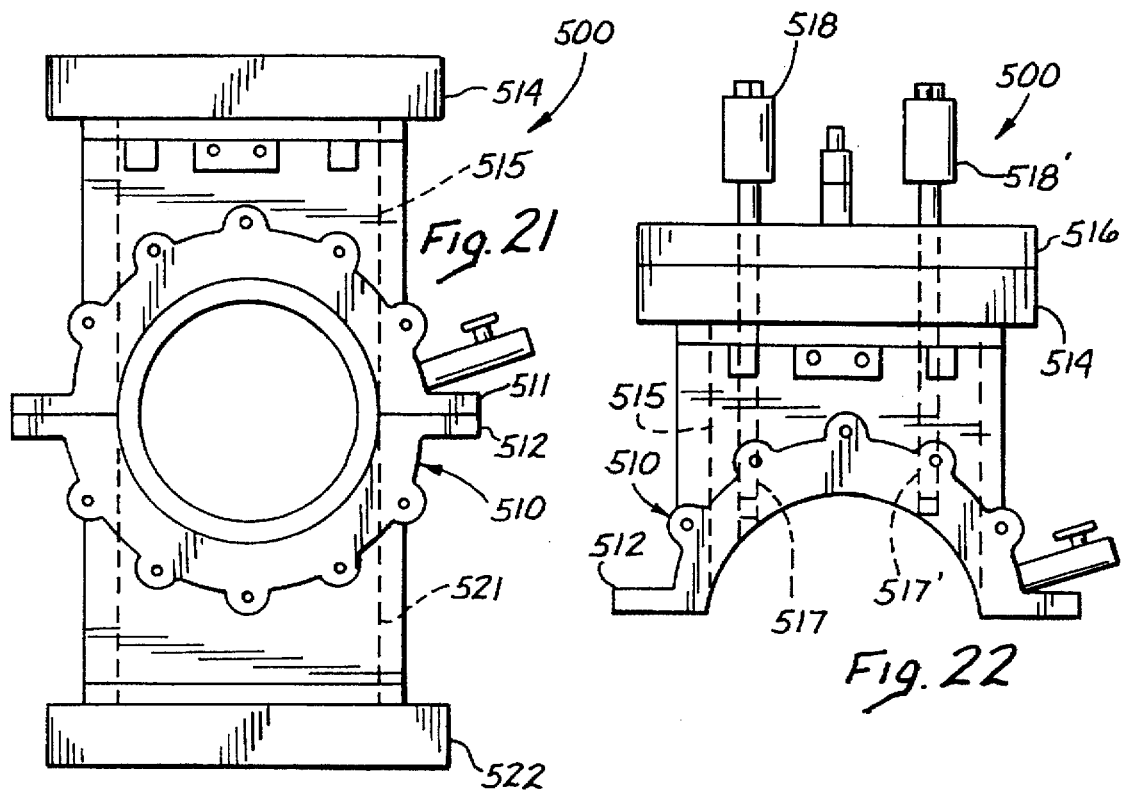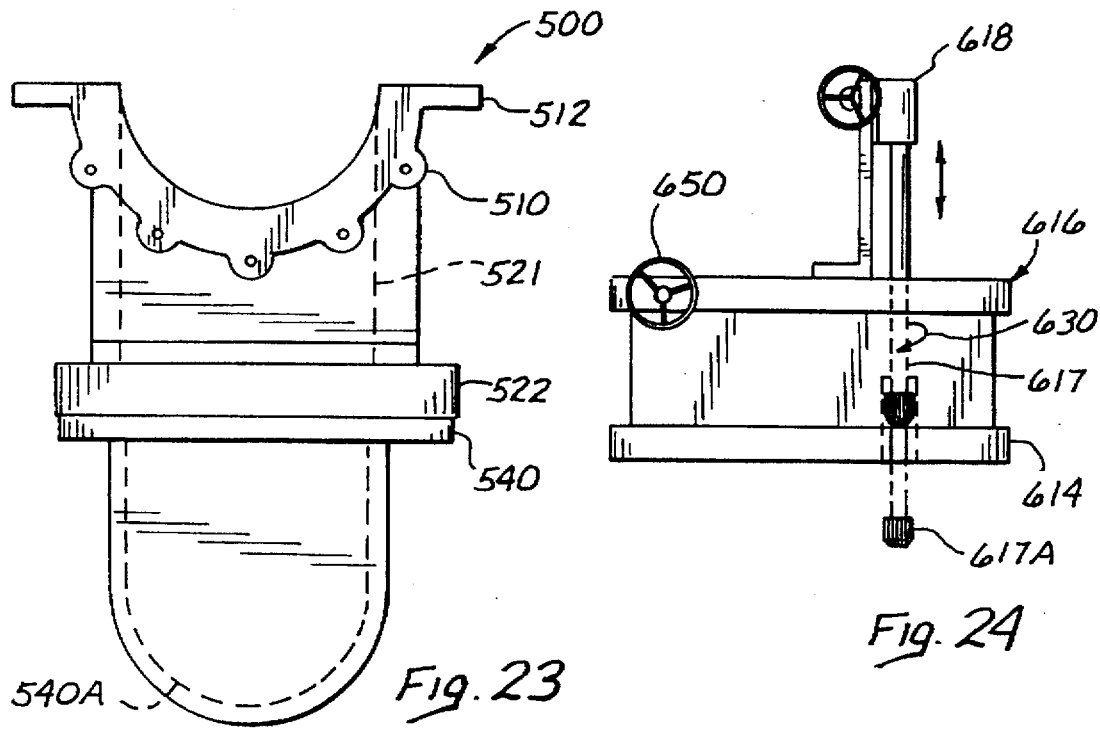

1

VALVE INSERTION METHOD AND ASSEMBLY FOR INSERTING A VALVE IN A LINE

CROSS-REFERENCE TO RELATED APPLICATIONS

This application is a continuation in part of the U.S. patent application naming the same inventor that was assigned Ser. No. 08/603,884 and a Feb. 22, 1996 filing date, which application is scheduled to issue on Mar. 18, 1997 as U.S. Pat. No. 5,611,365.

BACKGROUND OF THE INVENTION

1. Technical Field

This invention relates generally to procedures and equipment for stopping an existing water, sewer, or gas line containing fluid under pressure, and more particularly to a method and associated componentry for inserting a valve in a line without otherwise shutting down the line during insertion.

2. Description of Related Art

To visualize some of the problems of existing methods for valve insertion, consider the known vertical insertion technique for installing a gate valve into an existing water pipe. First, workmen install a cutter tool over the pipe at the insertion point and a jacking clamp adjacent to it. Next, they install a water-tight housing over the cutter tool. The housing includes a lower chamber that surrounds the cutter tool and an upper chamber into which the cutter is withdrawn after the pipe is cut.

With those components in place, the workmen operate the cutter to cut a section from the existing pipe. After doing that, they operate a lifting rod on the housing to raise the cutter tool and the freshly cut section into the upper chamber of the housing. Then, they operate a slide gate that seals the upper chamber from the lower chamber. With the upper chamber sealed off that way, they open the upper chamber and remove the cutter tool and section of pipe.

After removing the section of pipe, the workmen proceed to install the gate valve in its place. To do so, they first place the gate valve in the upper chamber of the housing and connect it to the lifting rod. Next, they close the upper chamber, open the slide gate, and operate the lifting rod to lower the gate valve into the position previously occupied by the removed section of pipe. With the gate valve in position, the workmen then operate the jacking clamp to seal the newly installed gate valve in place.

The foregoing description makes many problems evident. The two-chamber housing and jacking clamp components can be large, complicated, and expensive, for example, and require skill, time, and space to install. In addition, the gate valve must be specially designed for installation with the jacking clamp apparatus. Other existing techniques and componentry have similar problems. Thus, users need a better technique and associated componentry for inserting a valve in an existing line.

U.S. Pat. No. 5,611,365 addresses the limitations outlined above by providing a valve assembly that operates both as a cutter tool and as a valve. It is referred to sometimes as a "rotatable pipe cutter" version of the invention. It includes a valve body, together with a gate assembly on the valve body that includes a gate and a gate actuating mechanism.

According to a major aspect of the invention, the valve body has two sections that bolt together or otherwise assemble over the pipe, and the gate includes at least one cutting tooth. In addition, the valve body is configured so that an operator can rotate the body on the existing pipe while operating the gate actuating mechanism in order to advance the gate from an open gate position of the gate (i.e., an open gate position) toward a closed position of the gate (i.e., a closed gate position). With the gate and the gate actuating mechanism orbiting the pipe with the valve body, and the gate advancing toward the closed gate position, the gate cuts through the pipe something like a pipe cutter.

Valve installation proceeds by assembling the two sections of the valve body together over the existing pipe with the gate in the open gate position. Next, the valve body is rotated on the pipe as the gate actuating mechanism is operated to advance the gate toward the closed position. The gate cuts through the pipe. Then, the operator opens or closes the gate when desired to open or close the line. Thus, the invention described in U.S. Pat. No. 5,611,365 enables use of smaller, less complicated, and less expensive components, and installation requires less skill, time, and space.

One remaining problem, however, concerns the excavation necessary to expose the pipe. Large diameter pipes can require huge excavations in order to provide enough clearance beneath the pipe for the gate assembly (i.e., the gate and the gate actuating mechanism) to orbit the pipe with the valve body. The larger the pipe, the larger the excavation required. The gate assembly extends radially from the pipe a distance greater than the diameter of the pipe, and the excavation has to be large enough to accommodate that dimensioning. Thus, users need an improved technique and associated componentry for inserting a valve in a large line.

SUMMARY OF THE INVENTION

This invention solves the problems outlined above by providing an assembly having a rotatable valve body, a cutting assembly, and a gate assembly. The gate assembly is adapted to be removably mounted on the valve body after first operating the rotatable valve body and cutting assembly together to make one or more cuts in the pipe. The user assembles the rotatable valve body on the pipe. Then, with the cutting assembly on the valve body, the user operates the cutting assembly to cut the pipe as the two components orbit the pipe together, all without the gate assembly on the valve body. Less clearance is required beneath the pipe as a result.

The assembly also includes a first sealing mechanism on the valve body for enabling a user to seal (i.e., close) the first access opening while forming a cut in the pipe and to unseal (i.e., open) the first access opening after forming the cut to enable gate assembly access through the first access opening to the pipe. The first sealing mechanism is disposed over the gate access opening. The user operates it to seal the gate access opening before making the cut in the pipe.

The gate assembly includes a gate and a gate actuating mechanism that are adapted to operate through the gate access opening. In other words, the gate access opening provides a passageway through the valve body for the gate. After making the cut in the pipe, the user mounts the gate assembly on the valve body. Then, the user operates the first sealing mechanism to unseal the gate access opening. Once that is accomplished, user operation of the gate actuating mechanism moves the gate radially through the gate access opening, between open and closed positions of the gate.

Regarding the cutting assembly, it includes a cutting element and a cutting element actuating mechanism that cooperate to form the cut as the valve body and cutting assembly orbit the pipe together. Any of various types of cutting elements may be employed according to the particular application, including carbide tipped cutting teeth, cutting wheels, diamond abrasives, milling heads, and high pressure fluid cutting components, to name just a few. Any of various known types of powering techniques may be employed for rotating the valve body and for actuating the cutting element without departing from the inventive concepts disclosed (e.g., electric, hydraulic, pneumatic, internal combustion engines, and/or manual).

One embodiment of the invention includes a cutting assembly that mounts removably on the valve body, operating through the gate access opening. Operating the cutting element actuating mechanism advances the cutting element through the gate access opening to the pipe, and through the pipe to form the cut. The user then withdraws the cutting element, seals the gate access opening, removes the cutting assembly, and mounts the gate assembly. After that, the user unseals the gate access opening to enable movement of the gate through the gate access opening. Another embodiment of the invention includes a second sealing mechanism on the valve body. It is on the valve body in a position disposed over a second access opening through the valve body. The second access opening provides access for cutting assembly operation and/or removal of pipe residue resulting from the cutting operation. Yet another embodiment includes a cutting assembly that remains mounted on the valve body.

To paraphrase some of the claim language that is subsequently presented, a method for inserting a valve in a line includes providing a valve body that is adapted to be assembled on and rotated about an existing pipe. The valve body includes a first access opening extending radially through the valve body that provides a passageway through the valve body to the pipe.

The method also includes the step of providing first sealing means on the valve body for enabling a user to seal the first access opening while forming a cut in the pipe and to unseal the first access opening after forming the cut to enable access through the first access opening to the pipe. It also includes providing cutting assembly means on the valve body for cutting the pipe as the valve body is rotated about the pipe to form the cut in the pipe, and providing gate assembly means adapted to be removably mounted on the valve body for moving a valve element through the first access opening in the valve body after forming the cut. The gate assembly means includes a gate assembly adapted to be mounted removably on the valve body, and the gate assembly includes a gate and a gate actuating mechanism that is adapted to move the gate through the first access opening between an open position of the gate and a closed position of the gate.

The method proceeds by (i) assembling the valve body on the pipe; (ii) rotating the valve body about the pipe with the cutting assembly means on the valve body and without the gate assembly means on the valve body; (iii) operating the cutting assembly means as the valve body and the first means orbit the pipe together to form the cut in the pipe; (iv) mounting the gate assembly means on the valve body; and (v) operating the sealing means in order to unseal the first access opening in the valve body and enable movement of the gate through the first access opening to the closed position of the gate.

One valve insertion assembly includes a removably mounted cutting assembly that moves a cutting element through the gate access opening to form the cut before withdrawing the cutting element, closing the gate access opening, and replacing the cutting assembly with the gate assembly. Another embodiment includes a second access opening and second sealing mechanism, for cutter assembly access and/or pipe residue removal purposes. The following illustrative drawings and detailed description make the foregoing and other objects, features, and advantages of the invention more apparent.

BRIEF DESCRIPTION OF THE DRAWINGS

FIG. 1 of the drawings is a left side view of a first valve assembly constructed according to the invention (a rotatable pipe cutter version);

FIG. 2 is a front view of the first valve assembly with portions in cross section, showing the body installed over an existing pipe with bearing components bolted on both sides of the valve body and with the gate in an open position;

FIG. 3 is an enlarged view of a portion of FIG. 2 that shows certain sealing and rotational details of the bearing components and the sealing gaskets installed next to the bearing components;

FIG. 4 is an enlarged view similar to FIG. 3 that shows sealing collars installed next to the sealing gaskets;

FIG. 8 is a side view of the first valve assembly fully installed on the pipe that shows cutting of the pipe by rotation of the valve body coupled with advancement of the gate;

FIG. 9 is another side view showing the gate in a closed position after cutting fully through the pipe;

FIG. 10 is a side view of a second valve assembly constructed according to the invention that includes a valve body outfitted with a gear sprocket to which a power driver is coupled;

FIG. 11 is an enlarged front view of a portion of the second valve assembly showing the power driver rotating the valve on the pipe;

FIG. 12 an enlarged view of a portion of a third valve assembly constructed according to the invention that includes additional cutting teeth;

FIG. 13 is a side view of a fourth valve assembly constructed according to the invention (a guillotine version);

FIG. 14 is a front view of the fourth valve assembly shown installed over an existing pipe with the gate in an open position before it slices through the pipe;

FIG. 15 is a diagrammatic left side view of a fifth assembly having a removable gate assembly, shown with the gate assembly removed, with the cutting assembly mounted on the valve body over the first access opening and the first sealing mechanism, and with the two sections of the valve body in position to be assembled over a pipe;

FIG. 16 is an enlarged diagrammatic view back view of a portion of the fifth assembly, showing the cutting element disposed within the first access opening as the cutting element advances radially toward the pipe to form the cut in the pipe;

FIG. 17 is a diagrammatic left side view of a portion of the fifth assembly, showing the removably mountable gate assembly installed on the valve body over the first access opening and first sealing mechanism after the cut is made, in place of the cutting assembly shown in FIG. 15;

FIG. 21 is a diagrammatic left side view of an assembled valve body on which are mounted two sealing mechanisms over two access openings through the valve body;

FIG. 22 is a diagrammatic left side view of an assembly having a removably mountable cutting assembly with multiple cutting elements;

FIG. 23 is a diagrammatic left side view of an assembly having a residue receptacle mounted on the valve body over a second sealing mechanism and second access opening; and FIG. 24 is a diagrammatic left side view of an assembly having a cutting assembly that rotates the cutting element while moving it radially and lengthwise along the pipe to form the cut.

DESCRIPTION OF THE PREFERRED EMBODIMENTS

Figure 5:
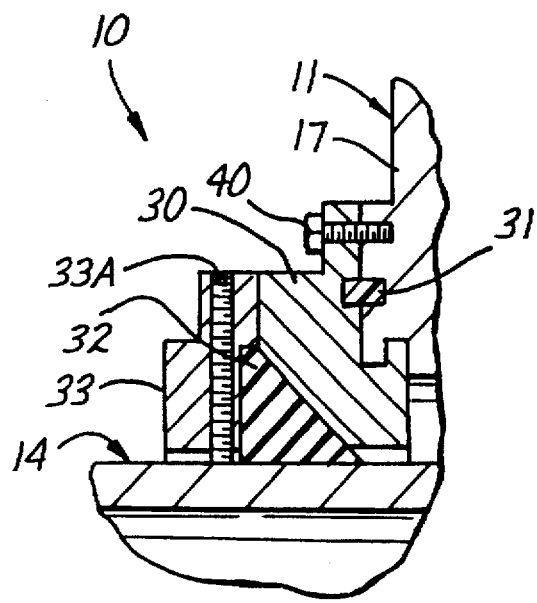
FIG. 5 is an enlarged view similar to FIG. 4 that shows details of a setscrew through one of the sealing collars.

The description of the preferred embodiments begins with a description of various "rotatable pipe cutter" embodiments of the invention illustrated in FIGS. 1–12. A "guillotine" embodiment is then described with reference to FIGS. 13 and 14, followed by a "removable gate assembly" embodiment FIGS. 15–24. A reader already familiar with the specification and FIGS. 1–14 of the parent application that issued as U.S. Pat. No. 5,611,365, may proceed directly to the description of the removable gate assembly embodiment.

Rotatable Pipe Cutter Embodiments

FIGS. 1–9 illustrate a method of valve insertion according to the invention by reference to details of a first valve assembly 10 and associated components. The first valve assembly 10 is similar in some respects to many existing gate valves. It includes a valve body 11, a gate 12, and a gate actuating mechanism 13 (FIG. 1). The valve body 11 installs on a pipe 14 (FIGS. 1–6, 8 and 9) so that fluid flowing through the pipe 14 must pass through the valve body 11. The pipe 14 represents any of various know pipe compositions (e.g., steel or other metal alloy, steel reinforced concrete, plastic, and so forth).

Rotation of the gate actuating mechanism 13 as depicted by an arrow 15 in FIG. 2 (a clockwise direction when looking down on the mechanism 13) causes the gate 12 to move as depicted by an arrow 16. The gate 12 moves from the open position shown in FIG. 2, in which the gate is withdrawn from the pipe 14, toward and to the closed position shown in FIG. 9, in which the gate 12 blocks the flow of fluid through the valve body 11. In the closed position, the gate 12 thereby blocks the flow of fluid through the pipe 14. Rotation of the gate actuating mechanism 13 in a direction opposite to that depicted by the arrow 15 causes the gate 12 to move in a direction opposite to that depicted by the arrow 16.

Thus, the first valve assembly 10 is similar in some respects to existing gate valves available from many commercial sources, including International Flow Technologies, Inc. of Murrieta, Calif., Mueller Company of Decatur, Ill., ITT Fluid Technology Corporation of Amory, Miss., and Free Flow Tapping & Inserting Company, Inc. of Naperville, Ill. It may include cast, molded, and/or machined components fabricated from known materials and according to many known techniques for installation on any of various existing pipes (e.g., twelve inch I.D. PVC-C-900 pipe). Unlike existing gate valves, however, the first valve assembly 10 includes what may be described as the combination of a split body and a pipe-cutting gate. Based upon the foregoing and subsequent descriptions, implementation of those features in a valve assembly constructed according to the invention is well within the capabilities of one of ordinary skill in the art.

To better understand what was referred to above as the combination of a split body and pipe-cutting gate, consider the first valve assembly 10 in further detail. The valve body 11 includes bolt-together first and second semicircular sections 17 and 18. They form what was referred to above as a split body, and they bolt together over the exterior of the existing pipe 14 with the pipe 14 containing water or other fluid under pressure as an initial step in installing the first valve assembly 10. FIGS. 2–6, 8 and 9 illustrate the two sections 17 and 18 assembled over the pipe 14 that way, with two bolts 19 and 20 being visible in FIGS. 8 and 9.

The gate 12 (e.g., a ¼-inch thick, ⅜-inch thick, or even thicker stainless steel component) includes a distal portion disposed toward the section 18 of the valve body 11 that is adapted to cut through the pipe 14 as the gate 12 advances from the open position toward the closed position. So, the gate 12 forms what was referred to above as a pipe-cutting gate. One form of pipe-cutting gate subsequently described with reference to a guillotine version of the invention that is illustrated in FIGS. 13 and 14, includes a cutting edge adapted to slice through an existing pipe composed of a sliceable material. However, the gate 12 of the first valve assembly 10 includes at least one protrusion or curing tooth 21 (FIGS. 2–4 and 6–9) adapted to cut through the wall of pipes composed of harder material.

The tooth 21 is formed from a suitably hard material (e.g., carbide steel) so that it cuts through the wall of the pipe 14 as the gate 12 is advanced toward the closed position and the valve body 11 is rotated on the pipe 14 (i.e., about a central longitudinal axis of the pipe 14). That cutting action may remind one of a rotatable pipe cutter, and that is why the valve assembly 10 is sometimes referred to as a rotatable pipe cutter version of the invention. The tooth 21 may be integrally formed with the gate 12 in one-piece construction, or it may be attached by suitable means. The tooth 21 is wide enough to cut a sufficiently wide path through the pipe 14 to accommodate the thickness of the gate 12. Additional teeth may also be provided on the gate 12 (not shown). Of course, a cutting wheel assembly (something like those plumbers are familiar with on some rotatable pipe cutters) may be used instead of a tooth.

The valve body 11 of the first valve assembly 10 does not fit tightly over the pipe 14. It fits loosely. It is dimensioned to fit loosely enough so that the valve body 11 can be rotated on the cylindrically shaped outer surface of the pipe 14 about a central longitudinal axis of the pipe 14 as the gate 12 is advanced toward the closed position. Bearing and sealing components subsequently described serve the function of rotatably mounting the valve body 11 on the pipe 14 while providing a seal between the valve body 11 and the pipe 14.

After installing the first valve assembly 10 on the existing pipe 14 with the bearing and sealing components, the installer rotates the valve body 11 on the pipe 14 (as depicted by arrows 22 and 23 in FIG. 8) while occasionally operating the gate actuating mechanism 13 as depicted by an arrow 24 in order to move the gate 12 toward the closed position. That combined action results in the tooth 21 (and any additional teeth) on the gate 12 cutting transversely through the pipe 14 to form a cut.

As the tooth 21 first cuts through the pipe 14, the installer may open a flush port 25 (FIGS. 1, 8, and 9) to allow fluid from the pipe 14 to flush away any particles that were produce as the tooth 21 cut through the pipe 14. The flush port 25 is then closed. Once the tooth 21 has cut fully through the wall of the pipe 14, the gate 12 may be moved to the fully closed position shown in FIG. 9 (disposed transversely across the pipe in the cut) to turn off the flow of fluid through the pipe 14. The gate 12 may also be moved to the fully open position shown in FIG. 2 to turn on the flow of fluid through the pipe 14, and it may be moved to any desired position between the fully closed and fully open positions to control fluid flow accordingly.

From the foregoing description, one of ordinary skill in the art can construct suitable bearing and sealing components for a valve assembly constructed according to the invention. By way of example, the bearing and sealing components that rotatably mount the illustrated valve body 11 on the pipe 14 while providing a seal between the valve body 11 and the pipe 14, include a first bearing/sealing assembly 26 on a first side 27 of the valve body 11 and a second bearing/sealing assembly 28 on a second side 29 of the valve body 11 (FIGS. 2-4).

The first bearing/sealing assembly 26 includes a first bearing component 30 having two parts or halves that can be bolted together over the pipe 14, similar to the way the two sections 17 and 18 of the valve body 11 can be bolted together over the pipe 14. The first bearing component 30 helps mount the valve body 11 on the pipe 14. It also allows rotation of the valve body 11 on the pipe 14 while retaining pressure against a first sealing ring 31 that provides a seal between the first side 27 of the valve body 11 and the first bearing component 30.

The first sealing ring 31 may be composed of nylon, brass, or other suitable sealing material. It is split so that it can be installed over the pipe 14. When bolted to the valve body 11, the first bearing component 30 forces a split in the first sealing ring 31 back together.

The first bearing/sealing assembly 26 also includes a split and tapered first gasket 32 (e.g., a commercially available sealing component composed of rubber or other suitable material), and it includes a first sealing collar 33 (sometimes referred to in the related art as a "gland") that cooperates with the first gasket 32 to provide a permanent seal between the first bearing component 30 and the pipe 14. The first sealing collar 33 also has two parts or halves that can be bolted together over the pipe 14, and it bolts to the first bearing component 30 during assembly as subsequently described to force a split in the first gasket 32 back together while wedging the first gasket 32 between the pipe 14 and the first bearing component 30.

Similarly, the second bearing/sealing assembly 28 includes a second bearing component 34 that helps mount the valve body 11 on the pipe 14 while permitting the valve body 11 to rotate on the pipe 14, a second sealing ring 35 that provides a seal between the second side 29 of the valve body 11 and the second bearing component 34, and a second gasket 36 that cooperates with a second sealing collar 37 to provide a seal between the second bearing component 34 and the pipe 14. The first and second bearing components 30 and 34 may be fabricated from steel or other suitably rigid material and they include annular flanges 38 and 39 (FIGS. 3 and 4) that interlock with the valve body 11 and provide a structure or track that upon which the valve body 11 rides as the valve body 11 rotates, while keeping the assembly together if forces tend to shift the pipe 14 after the gate 12 cuts through it. The first and second sealing rings 31 and 35 are held securely in position by bolting the first and second bearing components 30 and 34 to the valve body 11, as illustrated by two bolts 40 and 41 in FIGS. 3-6. Additional bolts are provided, but they are not visible in the drawings.

The first and second bearing components 30 and 34 are bolted to the valve body 11, with the first and second sealing rings 31 and 35 in place, after the valve body 11 is assembled over the pipe 14. Next, the first and second gaskets 32 and 36 are placed over the pipe 14 next to the first and second bearing components 30 and 34. Then, the first and second sealing collars 33 and 37 are installed loosely on the pipe 14.

The first and second sealing collars 33 and 37 are then bolted to respective ones of the first and second bearing components 30 and 34. That wedges each of the first and second rubber gaskets 32 and 36 between the pipe 14 and a respective one of the first and second bearing components 30 and 34. After the first and second sealing collars are bolted to the first and second bearing components, bolts holding the two halves of the first and second sealing collars 33 and 37 together are tightened to tighten the collars on the pipe 14 and complete the seal.

The first and second gaskets 32 and 36 may be commercially available split and tapered rubber rings, and the first and second sealing collars 33 and 37 may be suitably configured steel components. Each of the gaskets 32 and 36 is forced between the pipe 14 and a respective one of the first and second bearing components 30 and 34 by bolting the first and second sealing collars 33 and 37 to the first and second bearing components 30 and 34 as illustrated by two bolts 42 and 43 in FIGS. 4 and 6. Additional bolts are provided for that purpose, but only two are visible in the drawings.

Figure 6:
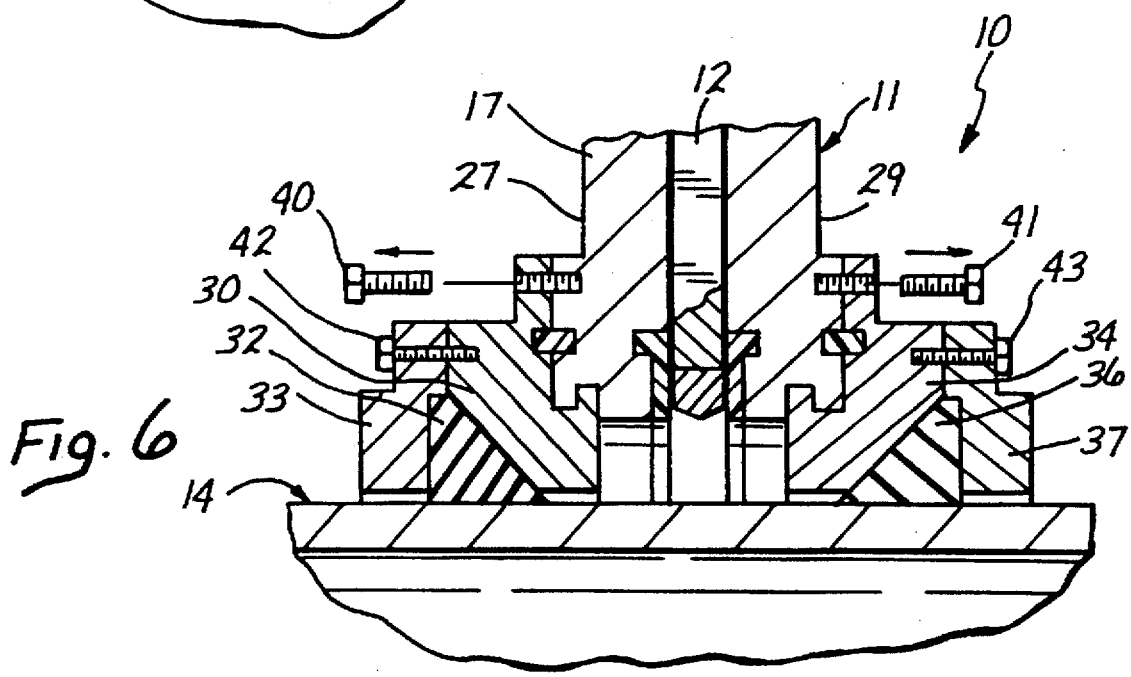
FIG. 6 is an enlarged view similar to FIG. 4 that shows disconnection of the bearing components to allow rotation of the valve body on the pipe.
Figure 7:
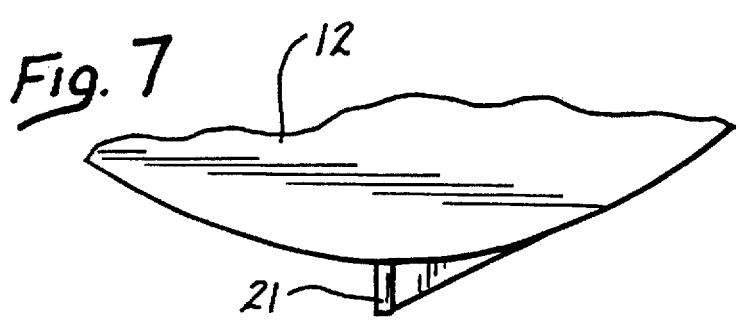
FIG. 7 is an enlarged right side view of a portion of the gate that shows further details of the cutting tooth.

Once the first and second sealing collars 33 and 37 are bolted to the first and second bearing components 30 and 34, and the sealing collars 33 and 37 are tightened on the pipe 14, the whole assembly is pressure tested by coupling a source of pressurized fluid to the flush port 25. Then, the first and second bearing components 30 and 34 are unbolted from the valve body 11, including removal of the bolts 40 and 41 as depicted in FIG. 6. That rotationally frees the valve body 11 from the first and second bearing components 30 and 34 so that the valve body 11 may be rotated on the pipe 11 as the tooth 21 on the gate 12 (and any additional teeth on the gate) cuts through the pipe 14. After the tooth 21 cuts through the pipe 14, the first and second bearing components are re-bolted to the valve body 11 (including reinstallation of the first and second bolts 40 and 41) to secure the valve body 11 against further rotation.

Sealing between the gate 12 and the valve body 11 is provided by first and second gate sealing rings 44 and 45 (FIGS. 2-4, and 6). They may be composed of the material commercially available under the trademark TEFLON, or other suitable material. They may include semicircular halves that fit in suitable annular channels in the first and second sections 17 and 18 of the valve body 11 that are provided for that purpose. A recess 46 in the second section 18 of the valve body 11 (FIG. 2) receives the tooth 21 when the gate 12 is in the closed position. Suitable means, such as a set screw 33A that is visible in FIG. 5, stops the sealing collar 33 from rotating on the pipe 14. The set screw may include a serrated foot pad that grips the pipe 14, and the second sealing collar 37 may include a similar set screw (not shown).

Rotation of the valve body 11 may be accomplished manually by grasping the gate actuating mechanism 13 or part of the valve body 11, and then rotating the valve assembly 10 in full circles about the pipe 14. Instead of manually rotating the valve body 11 of the first valve assembly 10, the installer may elect, instead, to use the second valve assembly 100 shown in FIGS. 10 and 11. The second valve assembly 100 is similar in many respects to the first valve assembly 10, and so only differences are discussed in further detail. For convenience, numerals designating parts of the second valve assembly 100 are increased by one hundred over those designating corresponding parts of the first valve assembly 10.

One difference is that the second valve assembly 100 includes a valve body 111 that forms a sprocket 150 (FIGS. 10 and 11), and it includes a drive component 151 mounted on the pipe 114 by suitable structure 152 (FIG. 11). A gear 153 on the drive component 151 engages the sprocket 150. Operation of the drive component 151 causes the gear 153 to rotate as depicted by an arrow 154 in FIG. 11. That motion is coupled to the sprocket 150 to rotate the valve body 111 on the pipe 114 as depicted by an arrow 155.

The drive component 151 may take any of various known forms, including any of various electric, pneumatic, and hydraulic motors. It may even take the form of a manually driven ratchet that the installer operates by pumping a ratchet handle on drive component 151 (not shown). It is intended that the drive component 151 illustrate all such variations.

The drive component 151 may be configured to alternate rotational directions. In other words, it may be configured to drive the valve body 111 in the direction of the arrow 155 from a starting point through an arc of predetermined size less than a full circle, then reverse direction until the valve body 111 returns to the starting point, and then repeat the foregoing back-and-forth motion. The installer need not rotate the valve body 111 in a full circle, and the sprocket 150 can extend in an arc less than a full circle. That feature can be helpful in situations where insufficient space exists around the pipe 114 for rotation in a full circle.

The second valve assembly 100 includes a bonnet 156 (FIG. 10) and a gate actuating mechanism 113 that combine to give the second valve assembly a smaller profile than the first valve assembly 10. The smaller profile also helps in tight installations where limited space exists around the pipe 114, and it is useful for direct burial service.

FIG. 12 shows a portion of a third valve assembly 200 constructed according to the invention. The third valve assembly 200 is also similar in many respects to the first valve assembly 10, and so only differences are described in further detail. For convenience, reference numerals designating parts of the third valve assembly 200 are increased by two hundred over those designating corresponding parts of the first valve assembly 10.

One difference is that the valve body 211 includes a handle member 260 that removable mounts on the second section 218 of the valve body 211 temporarily. The installer grasps the handle member 260 in order to rotate the valve body 211. He removes the handle member 260 after installation is complete.

Another difference is that the third valve assembly 200 includes additional cutting teeth 261 and 262 (e.g., carbide steel). They are radially adjustable so that they can be advanced occasionally for pipe-cutting purposes as the valve body 211 is rotated. They are partially withdrawn after installation of the third valve assembly 200 is complete. For that purpose, the teeth 261 and 262 may take the form of exteriorly threaded members that screw into interiorly threaded holes in the second section 218. They may, for example, include heads adapted to receive a conventional Allen wrench.

Guillotine Version

FIGS. 13 and 14 show a fourth valve assembly 300 constructed according to the invention. The fourth valve assembly 300 is similar in some respects to the first valve assembly 10, and so only differences are described in further detail. For convenience, reference numerals designating pans of the fourth valve assembly 300 are increased by three hundred over those designating corresponding pans of the first valve assembly 10.

One difference is that the gate 312 includes a cutting edge 370 that is adapted to slice through the pipe 314 as the gate 312 is advanced toward the closed position. Thus, the valve body 311 need not be rotated on the pipe 314 and bearing/sealing assemblies or similar rotational components are not needed. Of course, the fourth valve assembly 300 is particularly suited for use with pipes made of polyethylene and other sliceable materials, and the pipe 314 is intended to depict such a sliceable pipe.

The illustrated first and second sections 317 and 318 of the valve body 311 bolt together or otherwise assemble together over the pipe 314 tightly so that they grip the pipe 314. Although not used in the illustrated embodiment, sealing gaskets and sealing collars can be employed also, similar to those used with the first valve assembly 10. Fusing (e.g., known pipe fusing techniques for plastic pipe) or other suitable bonding technique may be used to produce a bond between the valve body 317 and the pipe 314 during assembly to connect the valve body to the pipe and enhance the grip. The illustrated gate 312 is a stainless steel member that narrows in thickness from approximately ¼ inch to the knife-like cutting edge 370. A straight cutting edge may be employed instead of the rounded cutting edge 370 illustrated. Seals 371, 372, and 373 are suitable sealing members that provide a seal between the gate 312. In addition, the fourth valve assembly 300 may be configured with a bonnet, similar to the second valve assembly 100 in FIG. 10.

Recapitulating the methodology employed with the foregoing embodiments, a method of inserting a valve in a line includes the step of providing a valve assembly having a valve body that includes two sections adapted to be assembled together over an existing pipe and a gate that includes a portion adapted to cut through the pipe as the gate is advanced from an open position of the gate to a closed position of the gate. The method proceeds by installing the valve assembly on the existing pipe with the gate in the open position, and then moving the gate to the closed position to thereby cut through the pipe. The valve assembly may be a rotatable pipe cutter version with the method including rotation of the body coupled with advancement of the gate, or the valve assembly may be a guillotine version with the method including slicing through the pipe as the gate is advanced toward the closed position. Either way, the valve assembly operates both as a cutter tool and as a valve, enabling use of smaller, less complicated, and less expensive components, and resulting in installation requiring less skill, time, and space.

REMOVABLE GATE ASSEMBLY EMBODIMENT

Now consider FIGS. 15-24. They show various assemblies that all include a removable gate assembly. They are similar in many respects to the rotatable pipe cutter embodiments already described, and so the drawing figures are diagrammatic representations that identify the major differences. The precise details of the bearing and sealing components interfacing the valve body to the pipe, and many other previously described details, are not described at this point in the description. Based upon the drawings, the claims, and the preceding and subsequent descriptions, one of ordinary skill in the art can readily implement the assemblies subsequently described and claimed.

For additional background, reference may be made to U.S. patent application Ser. No. 368,677 filed Jan. 4, 1995 by the same applicant/inventor as this application. It has been allowed and it is in the process of being issued as U.S. Pat. No. 5,611,365. It describes a valve assembly with a removable gate assembly, and that patent is incorporated herein by reference for the information provided.

The removable gate assembly enables a user to use a low profile cutting assembly on the valve body for curing purposes. Low profile means less clearance beneath the pipe. That is important for some of the huge pipes encountered. They may be fabricated of steel reinforced concrete, for example, smaller ones measuring 12 inches in diameter (even less) and larger, and larger ones measuring 72 inches to 78 inches in diameter, or more, and be buried deep within the ground where excavation concerns are important. After the pipe has been cut, the user mounts the higher profile gate assembly on the valve body for normal valve operation.

The valve body is adapted to be assembled on and rotated about an existing pipe. It mounts rotatably on the pipe. It is dimensioned to fit loosely enough so that it can be rotated on the cylindrically shaped outer surface of the pipe about a central longitudinal axis of the pipe. Bearing and sealing components between the valve body and the pipe (e.g., those components previously described) serve the function of rotatably mounting the valve body on the pipe while providing a seal between the valve body and the pipe. Rotatably mounted on the pipe that way, the valve body functions as a carriage for the cutting assembly and as a supporting structure for the gate assembly.

The valve body includes a first or gate access opening over which a first sealing mechanism is installed. The user proceeds operationally by (i) assembling the valve body on the pipe; (ii) rotating the valve body about the pipe with the cutting assembly on the valve body and without the gate assembly on the valve body; (iii) operating the cutting assembly as the valve body and the cutting assembly orbit the pipe together to form the cut in the pipe; (iv) mounting the gate assembly on the valve body; and (v) operating the first sealing mechanism in order to unseal the first access opening in the valve body and enable operation of the assembly through the first access opening to a closed position.

FIGS. 15 and 16 illustrate some of the foregoing aspects. FIG. 15 is a diagrammatic left side view of an assembly 400, and FIG. 16 is a diagrammatic back view. The assembly 400 includes a liquid-tight valve body 410 (i.e., liquid can not escape from it in an uncontrolled manner) having at least a first section 411 and a second section 412. The first and second sections 411 and 412 are adapted to be assembled together (e.g., sealing together by known means with liquid-tight joints between them) over a pipe 413 to form the liquid-tight valve body 410 and to be rotated about the pipe 413. The assembly 400 also includes at least a first sealing mechanism 414 mounted by suitable means on the valve body 410 over a first or gate access opening 415 (depicted by dashed lines in FIG. 15) through the first section 411 of the valve body 410. The first access opening 415 functions in a similar manner to the bonnet isolator mechanism described in the U.S. patent previously incorporated herein by reference (U.S. Pat. No. 5,611,635) and it may use any of various known isolating, valving, or gating structures (e.g., slide gate, elongated swing check, and ball valve methods).

The first access opening 415 provides a liquid-tight passageway through the valve body 410 to the pipe 413. The first sealing mechanism 414 functions as first sealing means on the valve body 410 for enabling a user to seal (close) the first access opening 415 with a liquid-tight seal (while forming a cut in the pipe 413) and to unseal (open) the first access opening 415 (after forming the cut) to enable gate assembly access through the first access opening 415 to the pipe 413. The illustrated first sealing mechanism 414 is adapted to mount removably on the valve body 410 with a liquid-tight fit. The user operates the first sealing mechanism 414 to seal the first access opening 415 and thereby prevent liquid under pressure in the pipe 413 from escaping through the first access opening 415 in an uncontrolled manner while changing from a cutting mode of operation to a gate bonnet installation (i.e., installation of the gate assembly subsequently described).

The access opening 415 through the valve body 410 is shaped and dimensioned to enable movement of a valve element (e.g., the gate of the removably mountable gate assembly subsequently described) through the access opening 415 to a closed position disposed transversely across the pipe 413, a position in which the valve element blocks the flow of liquid through the pipe 413. The first sealing mechanism 414 is also adapted to enable movement of the valve element through it to the closed position. Based upon the preceding and subsequent descriptions, the drawings, the claims, and the U.S. patent incorporated herein by reference, one of ordinary skill in the art can readily provide a suitable first sealing mechanism. One first sealing mechanism embodiment includes, for example, a slidable steel plate within a housing that mounts over the first access opening, with the plate being adapted to slide over and thereby seal the first access opening when the user slides the plate to a sealed or closed position. Another embodiment includes, for another example, a rotatable drum within the housing that blocks and thereby seals the first access opening. Visualize the drum as something like a roller pin blocking the first access opening. The drum has an axially elongated slot extending radially through it that aligns with the first access opening when the user rotates the drum to an unsealed or open position. Yet another embodiment utilizes a swinging chord that is fixed on one side and rotated exteriorly as a flapper of swing check.

The assembly 400 includes a cutting assembly 416 that mounts on the valve body 410 with a liquid-tight fit so that when liquid under pressure within the pipe 413 escapes, it is contained within the valve body 410 without escaping through the cutting assembly 416 in an uncontrolled manner. The cutting assembly 416 functions as cutting assembly means on the valve body 410 for cutting the pipe 413 as the valve body 410 is rotated about the pipe 413, to thereby form the cut in the pipe 413. With the cutting assembly 416 on the valve body 410, and the valve body 410 rotating about the pipe 413, the valve body 410 and the cutting assembly 416 orbit the pipe 413 together.

The cutting assembly is adapted to be removably mounted on the valve body 410. The illustrated cutting assembly 416 does so in the sense that it removably mounts on the first sealing mechanism 414, and the first sealing mechanism 414, in turn, mounts on the valve body 410, both with liquid-tight fits. The cutting assembly 416 includes a cutting element 417 (with a cutting head 417A that is visible in FIG. 16) and a cutting element actuator 418. The cutting element actuating mechanism 418 is adapted to advance the cutter element 417 radially through the first access opening 415 in the valve body 410 to the pipe 413 (and also to rotate the cutting element ninety degrees after the cutting element has cleared the gate access opening area), and then through the pipe 413 to form the cut through the pipe 413. A second actuator 419 function in a similar manner as the actuator 418. A valve 420 provides a port through which to blow out shavings and other residue produced during the cutting process.

With the removably mountable cutting assembly 416, the user proceeds operationally by (i) assembling the valve body 410 on the pipe 413, (ii) rotating the valve body 410 about the pipe 413 with the first access opening 415 unsealed while operating the cutting element actuating mechanism 418 with its cutting element 417 and cutting head 417A, and, optionally the cutting element actuating mechanism 419 (with a cutting element 419A and a cutting head 419B) in order to advance the cutting element 417 (and the cutting element 419A) through the first access opening 415 to the pipe 413, and through the pipe 413 to form the cut, (iii) withdrawing the cutting element 417 out of the first access opening 415, (iv) operating the first sealing means 414 to seal the first access opening 415, and (v) removing the cutting assembly 416 from the valve body 410 before then mounting the gate assembly on the valve body 410.

An alternate embodiment of an assembly constructed according to the invention includes a cutting assembly that does not access the pipe through the first access opening. FIG. 15 illustrates that aspect of the invention in phantom lines that depict the second section 412 of the valve body 410 including a second access opening 421 over which a second sealing mechanism 422 is mounted. The cutting assembly 416 is depicted in phantom lines, mounted on the second sealing mechanism 422 over the second access opening 421.

Another alternate embodiment includes a cutting assembly that includes two radially moveable cutting elements that FIG. 12 serves to illustrate. The cutting elements take the form of the cutting teeth 261 and 262 in FIG. 12. They are mounted on the second section 412 of the valve body 410. They are radially adjustable so that they can be advanced occasionally for pipe-cutting purposes as the valve body 410 is rotated about the pipe 413. They are partially withdrawn after the cut is completed, and they may take the form of exteriorly threaded members that screw into interiorly threaded holes in the second section 412. It is intended that FIG. 12 serve as an illustration of that type of cutting assembly, one in which the cutting element does not access the pipe through the first access opening 415 and in which the cutting element remains on the valve body with the gate assembly subsequently described.

FIG. 17 illustrates a gate assembly 425 mounted removably on the first section 411 of the valve body 410. The gate assembly 425 includes a gate 426 and a gate actuating mechanism 427. The access opening 415 through the valve body 410 is shaped and dimensioned to receive the gate 426 in order to enable movement of the gate 426 through the first access opening 415 to a closed position of the gate 426 in which the gate 426 is disposed transversely across the pipe 413 within the cut in the pipe 413.

The embodiments illustrated in FIGS. 15–24 include a gate assembly adapted to be mounted removably on the valve body 410, with a liquid-tight fit. The illustrated gate assembly 425 does so in the sense that it mounts on the first sealing mechanism 414, and the first sealing mechanism 414, in turn, mounts on the first section 411 of the valve body 410. A suitable gate assembly 425 (including the gate and gate actuating assembly subsequently described) may take any of various forms without departing from the claims. The gate assembly 425 functions as gate assembly means adapted to be removably mounted on the valve body for moving a valve element (i.e., the gate 426) through the first access opening 415 in the valve body 410 after forming the cut in the pipe 413.

The gate assembly 425 includes a gate 426 and a gate actuating mechanism 427 that is adapted to move the gate 426 through the first access opening 415 between an open position of the gate 426 and a closed position of the gate 426. For 72-inch diameter pipes, for example, the gate 426 may be as much as 5 to 6 inches or more thick, and it is otherwise suitably dimensioned to block the flow of liquid through the pipe 413 when in the closed position of the gate. The gate actuating mechanism 427 may also take any of various forms, and it may be power driven or manually operated (along with including various gear reductions and angle drives for horizontal use). Operation of the gate actuating mechanism 427 moves the gate 426 radially between the fully open position of the gate 426 shown in FIG. 17 to the closed position of the gate 426. Suitable sealing is provided between the movable gate 426 and the valve body 410 (and between the first and second sections 411 and 412 of the valve body 410) to provide a liquid-tight seal. A bonnet 428 (depicted in FIG. 17 in phantom lines) is included over the gate for some installations where the gate assembly is eventually buried. The bonnet 428 encloses the gate 426 and much of the gate actuating mechanism 427 in order to isolate those components form the ground and associate elements.

Figure 18:
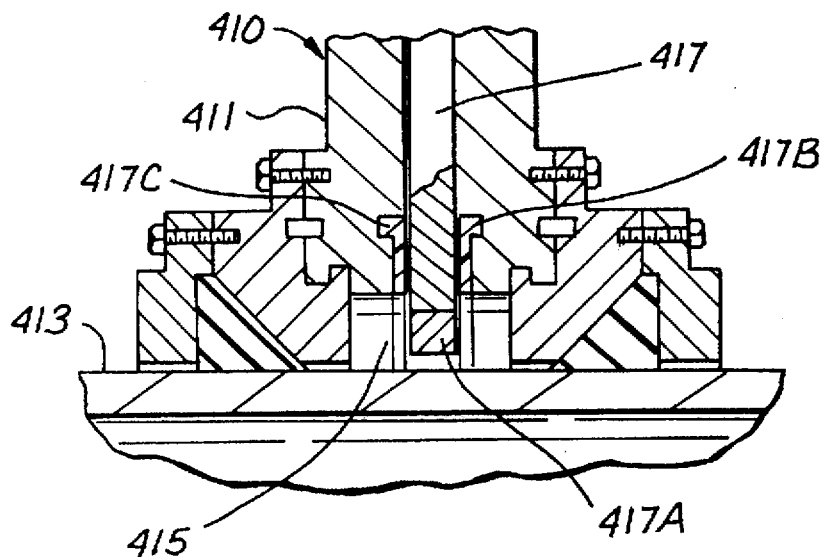
FIG. 18 is a further enlarged diagrammatic back view similar to FIG. 16, showing a portion of an assembly having a cutting element with a spade-shaped head, the cutting element being rotated ninety degrees from an operational position so that the spade-shaped head fits through the first access opening.
Figure 19:
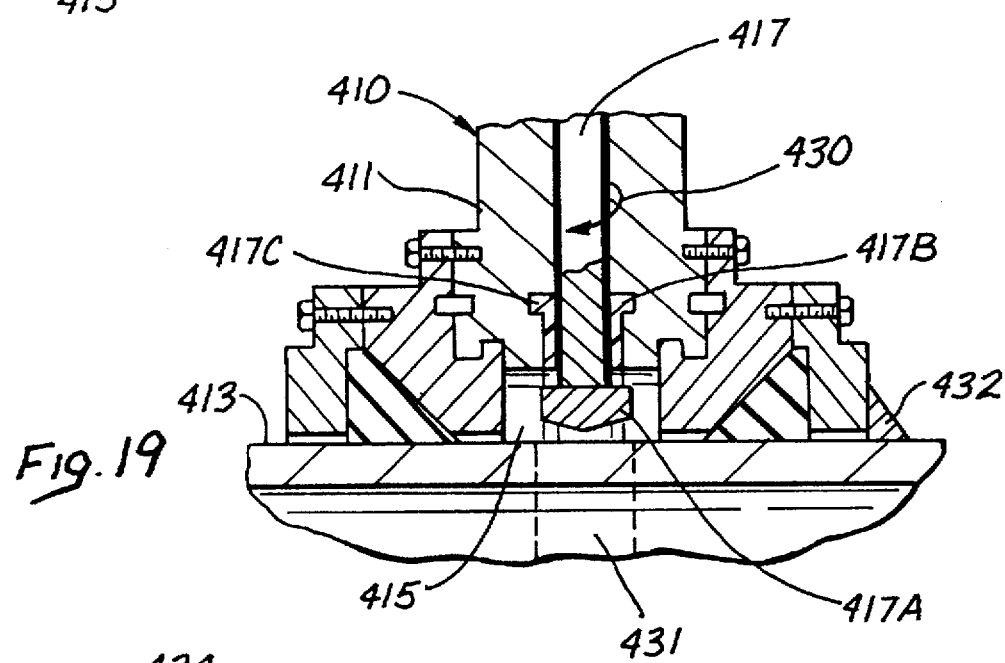
FIG. 19 is a diagrammatic back view similar to FIG. 18, showing the spade-shaped head rotated back ninety degrees to an operational position.

FIGS. 18 and 19 illustrate at least one spade-shape cutting head 417A, on the cutting element 417. The cutting head 417A (e.g., a sharpened carbide steel or abrasive diamond member) has a narrower profile when turned one way as illustrated in FIG. 18, and a wider profile when rotated ninety degrees. The narrower profile is narrower than the thickness of the gate 426 so that the cutting head 417A can pass easily through the gate seatings 417B and 417C in FIGS. 18 and 19 (without damaging the gate seating) to the position illustrated in FIG. 18.

Once the cutting head 417A is advanced to the position illustrated in FIG. 19, it is rotated back ninety degrees as depicted by an arrow 430 in FIG. 19. The wider profile is wider than the thickness of the gate 426 so that the gate can pass easily through the cut that is formed. The dashed lines through the pipe 413 depicted the boundaries of the cut that is made with the spade-shaped head 417A. The cut out material of the pipe 431 is depicted by reference numeral 431 in FIG. 19. FIG. 19 also includes a welded portion 432 to illustrate that components interfacing the valve body to the pipe 413 might be welded to the pipe 413 in particular applications.

Figure 20:
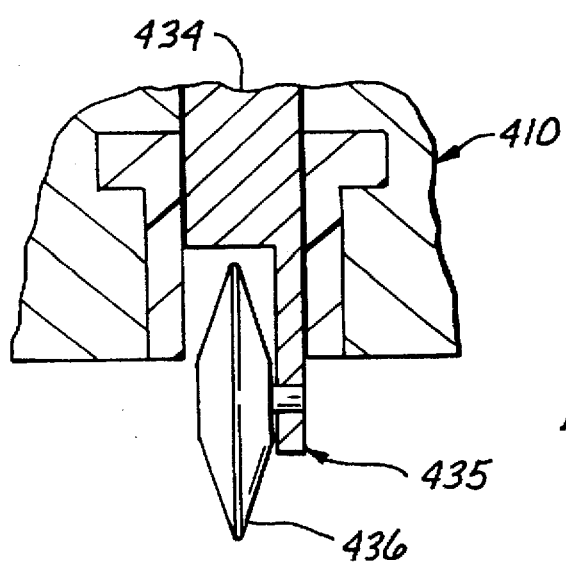
FIG. 20 is a further enlarged diagrammatic back view similar to FIG. 19 showing another form of cutting element that includes a cutting wheel assembly.

FIG. 20 illustrates another type of cutting element 434 that includes a cutting head in the form of a cutting wheel assembly 435. A suitably hard, sharp cutting wheel 436 is rotatably mounted so that it cuts through the pipe as the valve body 410 rotates about the pipe. From the information presented herein, one of ordinary skill in the art can readily practice the invention using any of various cutting elements, cutting heads, and cutting techniques in conjunction with a rotatable valve body that assembles on the pipe, a cutting assembly that orbits the pipe on the valve body, and a gate assembly that removable mounts on the valve body after the cut is made, all within the scope of the claims subsequently presented.

FIG. 21 illustrates a portion of an assembly 500 having a valve body 510 that includes a first section 511 with a first access opening 515 through it, and a second section 512 with a second access opening 521 through it. A first sealing mechanism 514 is mounted on the first section 511 over the first access opening 515 where it functions as first sealing means on the valve body 510 for enabling a user to selectively seal the first access opening 515 while forming a cut in the pipe and to unseal the first access opening 515 after forming the cut to enable access through the first access opening 515 to the pipe 413. A second sealing mechanism 522 is mounted on the second section 512 over the second access opening 522 where it functions as second sealing means for enabling the user to selectively seal the second access opening 522.

FIG. 22 illustrates a portion of the assembly 500 with a cutting mechanism 516 mounted on the first sealing mechanism 514. The cutting mechanism 516 is similar in many respects to the cutting mechanism 416 described previously, and it includes two spaced apart cutting elements 517 and 517' that are actuated by respective ones of two cutting element actuating mechanisms 518 and 518'. They both advance radially through the first access opening 515 in the first section 511 of the valve body 510.

FIG. 23 illustrates a portion of the assembly 500 with a residue receptacle 540 mounted removably on the second sealing mechanism 522. The residue receptacle 540 has an enclosed hollow interior depicted by a dashed line 540A), and it is adapted to mount removably on the valve body 510 so that the hollow interior 540A is in fluid communication through the second isolating mechanism 522 with the second access opening 521. The residue receptacle 540 can be used on the first sealing mechanism 512 if desired, depending on the particulars of the installation process. Shavings and/or other residue produce during the cutting process collects in the residue receptacle 540 for later removal. The illustrated residue receptacle 540 is adapted to be removably mounted on the valve body 510 in the sense that it mounts removably on the second sealing mechanism 522 (or on the first sealing mechanism 514), with the second sealing mechanism 522 mounting on the second section 512 (or the first sealing mechanism 514 mounting on the first section 511) of the valve body 510. FIG. 24 illustrates a portion of an assembly 600 that includes a cutting assembly 616 removably mounted on a first sealing mechanism 614. Unlike the cutting assemblies 416 and 516, the cutting assembly 616 includes a cutting element 617 with a head 617A that is rotated for cutting purposes. A first cutting element actuator 618 functions as means for moving the cutting element 617 radially as depicted by the double headed arrow in FIG. 24. It also functions as means for rotating the cutting element 617 (and the cutting head 617A) as depicted by an arrow 630 in FIG. 24. The cutting head may utilized known gearing in order to use cross cutting blades (e.g., such as a diamond saw blade, for example, or a carbide blade). It includes suitably powered components for those purposes.

In addition, the cutting assembly 616 includes a second cutting assembly actuator 650. It functions as means for moving the cutting element 617 lengthwise (i.e., longitudinally) along the pipe 413. The user operates the cutting assembly 616 to make a circumferentially extending cut in the pipe 413 as the valve body rotates about the pipe 413. The cut extends all the way around the pipe 413. Next, the user operates the second actuator mechanism 650 to move the cutting element 617 longitudinally along the pipe. Then, the user makes another cut in the pipe 413 (parallel to the first cut) by rotating the valve body about the pipe 413. That operation is repeated until a sufficiently large section of the pipe is removed (i.e., the cut is wide enough) to accommodate the thickness of the gate.

Thus, the invention provides an assembly having a rotatable valve body, a cutting assembly, and a gate assembly. After assembling the rotatable valve body on the pipe, the user rotates the valve body while operating a low profile cutting assembly on the valve body to cut the pipe as the two components orbit the pipe together, all without the gate assembly on the valve body. Less clearance is required beneath the pipe as a result. Although exemplary embodiments have been shown and described, one of ordinary skill in the art may make many changes, modifications, and substitutions without necessarily departing from the spirit and scope of the invention.

What is claimed is:

1. A method for inserting a valve in a line, comprising:

providing a valve assembly having a valve body that includes two sections adapted to be assembled together over an existing pipe and a gate that includes a portion adapted to cut through the pipe as the gate is advanced from an open position of the gate to a closed position of the gate;

installing the valve assembly on the existing pipe with the gate in the open position; and moving the gate to the closed position to thereby cut through the pipe;

wherein the valve body is adapted to be rotated on the pipe as the gate is advanced to the closed position;

wherein the gate includes at least one protrusion adapted to cut through the pipe as the gate is advanced toward the closed position while the valve body is rotated on the pipe;

wherein the step of moving the gate toward the closed position includes rotating the valve body on the pipe while advancing the gate toward the closed position so that the protrusion cuts through the pipe; and wherein the valve assembly includes a gate assembly that is adapted to be mounted removably on the valve body in order to enable rotation of the valve body on the pipe with the gate assembly removed from the valve body.

2. A valve assembly for insertion in a line, the valve assembly comprising:

a valve body having two sections adapted to be assembled together over an existing pipe to form an assembled valve body;

a gate mounted on the valve body for movement between open and closed positions of the gate;

means for providing a seal between the assembled valve body and the pipe while enabling rotation of the gate and the assembled valve body on the pipe together as the gate is advanced toward the closed position; and means for cutting the pipe as the gate and the assembled valve body are rotated on the pipe together in order to produce a path through the pipe while at the same time rotating the gate with the assembled valve body as the gate travels through the path in the pipe to the closed position;

wherein the means for cutting the pipe includes at least one member on the assembled valve body that is adapted to be advanced radially toward the pipe and cut the pipe as the gate and the assembled valve body are rotated on the pipe together and the gate is advanced to the closed position; and wherein the valve assembly includes a gate assembly of which the gate is a part, the gate assembly being adapted to be mounted removably on the valve body in order to enable rotation of the valve body on the pipe with the gate assembly removed from the valve body.

3. A method for inserting a valve in a line, comprising:

providing a valve body that is adapted to be assembled on and rotated about an existing pipe, the valve body including a first access opening in the valve body that provides a passageway through the valve body to the pipe;

providing first sealing means on the valve body for enabling a user to seal the first access opening while forming a cut in the pipe and to unseal the first access opening after forming the cut to enable access through the first access opening to the pipe;

providing cutting assembly means on the valve body for cutting the pipe as the valve body is rotated about the pipe to form the cut in the pipe; and providing gate assembly means adapted to be removably mounted on the valve body for moving a valve element through the first access opening in the valve body after forming the cut, the gate assembly means including a gate assembly adapted to be mounted removably on the valve body, the gate assembly including a gate and a gate actuating mechanism that is adapted to move the gate through the first access opening between an open position of the gate and a closed position of the gate;

(i) assembling the valve body on the pipe; (ii) rotating the valve body about the pipe with the cutting assembly means on the valve body and without the gate assembly means on the valve body; (iii)operating the cutting assembly means as the valve body and the cutting assembly means orbit the pipe together to form the cut in the pipe; (iv) mounting the gate assembly means on the valve body; and (v) operating the first sealing means in order to unseal the first access opening in the valve body and enable movement of the gate through the first access opening to the closed position of the gate.

4. A method as recited in claim 3, wherein:

the step of providing cutting assembly means includes providing a cutting assembly that is adapted to be removably mounted on the valve body, the cutting assembly including a cutting element and a cutting element actuating mechanism that is adapted to advance the cutting element radially through the first access opening in the valve body to the pipe, and through the pipe to form the cut through the pipe; and the step of rotating the valve body about the pipe includes (i) mounting the cutting assembly on the valve body, (ii) rotating the valve body on the pipe with the first access opening in the valve body unsealed while operating the cutting element actuating mechanism in order to advance the cutting element through the first access opening to the pipe, and through the pipe to form the cut, (iii) withdrawing the cutting element out of the first access opening in the valve body, (iv) operating the first sealing means to seal the first access opening in the valve body, and (v) removing the cutting assembly from the valve body before then mounting the gate assembly on the valve body.

5. A method as recited in claim 3, wherein the cutting assembly means is adapted to access the pipe for cutting purposes without passing through the first access opening and to remain on the valve body after the gate assembly means is mounted on the valve body.

6. A method as recited in claim 5, wherein the cutting element includes at least one radially adjustable cutting tooth.

7. A method as recited in claim 6, wherein the cutting tooth takes the form of an exteriorly threaded member that screws into an interiorly threaded hole in the valve body.

8. A method as recited in claim 5, wherein the cutting element includes means in the form of at least one cutter wheel assembly for cutting the pipe.

9. A method as recited in claim 3, wherein the step of providing a valve body includes providing a valve body having a second access opening, and the method includes the step of providing second sealing means on the valve body for selectively sealing and unsealing the second access opening.

10. An assembly for inserting a valve in a line, comprising:

a valve body that is adapted to be mounted on and rotated about an existing pipe, the valve body including a first access opening in the valve body that provides a passageway through the valve body to the pipe;

first sealing means on the valve body for enabling a user to seal the first access opening while forming a cut in the pipe and to unseal the first access opening after forming the cut to enable access through the first access opening to the pipe;

cutting assembly means on the valve body for cutting the pipe as the valve body is rotated about the pipe to form a cut in the pipe; and gate assembly means adapted to be removably mounted on the valve body after the cut is formed for moving a valve element through the first access opening in the valve body, the gate assembly means including a gate assembly that is adapted to be mounted removably on the valve body, the gate assembly including a gate and a gate actuating mechanism that is adapted to move the gate through the first access opening between an open position of the gate and a closed position of the gate.

11. An assembly as recited in claim 10, wherein the cutting assembly means includes a curing assembly that is adapted to be removably mounted on the valve body, the cutting assembly including a cutting element and a cutting element actuating mechanism that is adapted to advance the cutting element radially through the first access opening in the valve body to the pipe, and through the pipe to form the cut through the pipe.

12. An assembly as recited in claim 11, wherein the cutting element includes means in the form of at least one spade tooth for cutting the pipe.

13. An assembly as recited in claim 11, wherein the cutting element includes means in the form of at least one cutting wheel assembly for cutting the pipe.

14. An assembly as recited in claim 10, wherein the cutting assembly means includes at least one cutting element on the valve body that is adapted to access the pipe for cutting purposes without passing through the first access opening.

15. An assembly as recited in claim 10, wherein the cutting element includes at least one radially adjustable cutting tooth.

16. An assembly as recited in claim 10, wherein the cutting tooth takes the form of an exteriorly threaded member that screws into an interiorly threaded hole in the valve body.

17. An assembly as recited in claim 10, wherein the cutting element includes means in the form of at least one cutting wheel assembly for cutting the pipe.

18. An assembly as recited in claim 10, further comprising a second access opening in the valve body and means in the form of second sealing means for enabling a user to selectively open and close the second access opening.

* * * * *